(12) United States Patent
Ishikawa et al.

(10) Patent No.: US 8,604,662 B2
(45) Date of Patent: Dec. 10, 2013

(54) WINDSHIELD WIPER MOTOR (75) Inventors: Masaru Ishikawa, Kiryu (JP); Kenji Sakata, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 244 days.

(21) Appl. No.: 12/934,183

(22) PCT Filed: Mar. 19, 2009

(86) PCT No.: PCT/JP2009/055493
§ 371 (c)(1),
(2), (4) Date: Sep. 23, 2010

(87) PCT Pub. No.: WO2009/119456
PCT Pub. Date: Oct. 1, 2009

(65) Prior Publication Data
US 2011/0018385 A1   Jan. 27, 2011

(30) Foreign Application Priority Data

Mar. 24, 2008 (JP) .................................. 2008-075902
Oct. 30, 2008 (JP) .................................. 2008-280551

(51) Int. Cl.
H02K 23/20 (2006.01)
H01R 39/32 (2006.01)
H01R 39/38 (2006.01)

(52) U.S. Cl.
USPC ........... 310/239; 310/75 R; 310/234; 310/238

(58) Field of Classification Search
USPC ........... 310/75 R, 89, 40 MM, 239, 234, 238, 310/248
See application file for complete search history.

(56) References Cited

U.S. PATENT DOCUMENTS 4,754,184 A * 6/1988 Morikane et al. ............. 310/239
5,023,532 A   6/1991 Gakenholz
(Continued)

FOREIGN PATENT DOCUMENTS

JP   45-004747   3/1970
JP   61-112556   5/1986
(Continued)

OTHER PUBLICATIONS

International Search Report from corresponding International Application No. PCT/JP2009/055493 dated Jun. 16, 2009 (6 pages).
(Continued)

*Primary Examiner* — Burton Mullins
(74) *Attorney, Agent, or Firm* — McCormick, Paulding & Huber LLP (57) ABSTRACT

A motor 10 includes: a yoke on whose inner surface a four-pole magnet is attached; a gear case 15 jointed to an opening portion of the yoke and storing a speed-reduction mechanism; a brush holder 30 stored in an opening portion 15a of the gear case and having a through hole 31 penetrated by a commutator 23 attached to an armature shaft 21 in a center of the brush holder; and a first brush 36, a second brush 35, and a third brush 37 which are stored so as to freely come in and out to/from three brush storing portions 32, 33, and 34 formed so as to interpose the through hole 31 in the brush holder 30. In the motor, the second brush 35 is arranged at a position shifted from the first brush 36 in a rotational direction by 90 degrees, and a third brush 37 is arranged within an included angle opposite to an included angle formed by the first brush 36 and the second brush 35.

13 Claims, 10 Drawing Sheets (56) References Cited

U.S. PATENT DOCUMENTS

| | | | |
|---|---|---|---|
| 5,047,679 A * | 9/1991 | Baader et al. | 310/89 |
| 5,485,049 A * | 1/1996 | Shannon et al. | 310/248 |
| 5,744,890 A | 4/1998 | Yamaguchi et al. | |
| 6,043,581 A | 3/2000 | Tanaka et al. | |
| 6,127,759 A | 10/2000 | Tanaka et al. | |
| 6,320,293 B1 | 11/2001 | Yamada et al. | |
| 6,452,297 B2 | 9/2002 | Yamamoto et al. | |
| 6,462,454 B2 | 10/2002 | Yamamoto et al. | |
| 6,617,744 B2 * | 9/2003 | Kershaw et al. | 310/239 |
| 6,677,693 B2 | 1/2004 | Ooyama | |
| 6,694,599 B1 | 2/2004 | Kershaw et al. | |
| 6,703,751 B2 | 3/2004 | Tanaka et al. | |
| 7,291,957 B2 * | 11/2007 | Simofi-Ilyes et al. | 310/249 |
| 7,557,484 B2 | 7/2009 | Kawashima et al. | |
| 2002/0079758 A1 | 6/2002 | Matsuyama et al. | |
| 2008/0231137 A1 * | 9/2008 | Sugishima et al. | 310/197 |
| 2010/0052440 A1 * | 3/2010 | Shioda et al. | 310/51 |
| 2011/0018380 A1 * | 1/2011 | Yoshida et al. | 310/154.21 |
| 2011/0095638 A1 | 4/2011 | Sakata et al. | |
| 2011/0198954 A1 | 8/2011 | Saito et al. | |

FOREIGN PATENT DOCUMENTS

| | | |
|---|---|---|
| JP | 02-184246 | 7/1990 |
| JP | 03-11963 | 1/1991 |
| JP | 03-500960 A | 2/1991 |
| JP | 05-018272 | 3/1993 |
| JP | 7-28756 | 5/1995 |
| JP | 09-023627 | 1/1997 |
| JP | 10-503640 A | 3/1998 |
| JP | 2000-060049 A | 2/2000 |
| JP | 2000-166185 A | 6/2000 |
| JP | 2001069723 A | 3/2001 |
| JP | 2001-095219 A | 4/2001 |
| JP | 2001-112217 A | 4/2001 |
| JP | 2001268856 A | 9/2001 |
| JP | 2001-320862 A | 11/2001 |
| JP | 2002-017061 A | 1/2002 |
| JP | 2002-058227 A | 2/2002 |
| JP | 2002-218692 A | 8/2002 |
| JP | 2002-233123 A | 8/2002 |
| JP | 2002-291210 A | 10/2002 |
| JP | 2002-305861 A | 10/2002 |
| JP | 2002-315274 A | 10/2002 |
| JP | 2002320361 A | 10/2002 |
| JP | 2002-325390 A | 11/2002 |
| JP | 2003-153488 A | 5/2003 |
| JP | 2004-056851 A | 2/2004 |
| JP | 2004-248460 A | 9/2004 |
| JP | 2004-274816 A | 9/2004 |
| JP | 2004-274821 A | 9/2004 |
| JP | 2004-289992 A | 10/2004 |
| JP | 2005-012945 A | 1/2005 |
| JP | 2006033947 A | 2/2006 |
| JP | 2006-352993 A | 12/2006 |
| JP | 2006-353019 A | 12/2006 |
| JP | 2006353019 A | 12/2006 |
| JP | 2007143278 A | 6/2007 |
| JP | 2007-173278 A | 7/2007 |
| JP | 2008-092731 A | 4/2008 |
| JP | 2008-131800 A | 6/2008 |
| JP | 2008-253086 A | 10/2008 |
| JP | 2008-253137 A | 10/2008 |
| JP | 2009-017719 A | 1/2009 |
| JP | 2010-011697 A | 1/2010 |
| JP | 2010-017078 A | 1/2010 |
| JP | 2010-022198 A | 1/2010 |
| JP | 2010-022199 A | 1/2010 |
| JP | 2010-022200 A | 1/2010 |
| JP | 2010-022201 A | 1/2010 |
| JP | 2010-035403 A | 2/2010 |
| JP | 2010-035405 A | 2/2010 |
| JP | 2012-187000 A | 9/2012 |
| JP | 2012-200145 | 10/2012 |
| JP | 2012-200146 | 10/2012 |
| WO | 2005-076442 A1 | 8/2005 |
| WO | 2010-001899 A1 | 1/2010 |
| WO | 2010-041448 A1 | 4/2010 |

OTHER PUBLICATIONS

Chinese Office Action dated Jan. 14, 2013 and English translation thereof.

* cited by examiner

WINDSHIELD WIPER MOTOR

CROSS REFERENCE TO RELATED APPLICATIONS

This application is entitled to the benefit of and incorporates by reference essential subject matter disclosed in International Patent Application No. PCT/JP2009/055493 filed on Mar. 19, 2009 and Japanese Patent Application No. 2008-075902 filed Mar. 24, 2008 and Japanese Patent Application No. 2008-280551 filed on Oct. 30, 2008.

TECHNICAL FIELD

The present invention relates to a motor such as a windshield wiper motor used in a wiper device of wiping a wiped surface such as a windshield glass in an auto vehicle.

BACKGROUND ART

As a windshield wiper motor of this type, there is a motor known such that, by providing the number of motor poles (field portions) as four or more poles for the multipolarity, magnetic saturation in a yoke is reduced and torque is improved with improvement of an operating point, and the motor can be sized down (see, for example, Japanese Patent Application Laid-Open Publication No. 2007-143278 (FIGS. 2 and 3)).

DISCLOSURE OF THE INVENTION

For example, when a four-pole motor is applied as the windshield wiper motor, there are provided at least a pair of brushes which are arranged away from each other by 90 degrees around a rotational direction. Also, when a driving speed of the wiper can be switched, another brush shifted from the pair of brushes by a predetermined angle in the rotational direction is required. Therefore, in a conventional four-pole motor, the brush is arranged in a circular-shaped brush holder as described in Japanese Patent Application Laid-Open Publication No. 2007-143278.

However, when the brush holder has the circular shape, an opening portion of a gear case and/or an opening portion of a yoke in which the brush holder is equipped are required to also have the circular shape, and therefore, a whole windshield wiper motor cannot be sized down and thinned.

Accordingly, the present invention is made for solving the above-described problems, and a preferred aim of the present invention is to provide a windshield wiper motor which can be sized down and thinly lightweight as a whole by forming the shape of the brush holder as small as possible.

A windshield wiper motor of the present invention includes: a motor yoke of rotatably supporting an armature shaft; a four-pole magnet fixed on an inner surface of the motor yoke; an armature core having a plurality of coil-wound portions (which are also generally called "teeth") each arranged in a rotational direction and fixed at the armature shaft; a commutator having a plurality of commutator bars each arranged in the rotational direction and fixed at the armature shaft; winding wound around the coil-wound portions of the armature core and electrically connected with each of the commutator bars; a connection member electrically connected with the commutator bars whose potentials are to be the same with each other; a first brush slidingly contacted with the commutator bar; a second brush shifted from the first brush by 90 degrees and supplying a driving current to the winding; and a brush holder of storing the first brush and the second brush. The brush holder includes: a pair of flat portions opposite to each other; and a pair of joint portions of jointing between the pair of flat portions, and the first brush and the second brush are arranged on one side of the pair of joint portions.

In the windshield wiper motor of the present invention, a third brush is arranged on the other side of the pair of joint portions.

In the windshield wiper motor of the present invention, a third brush is arranged on one side of the pair of joint portions.

In the windshield wiper motor of the present invention, the second brush is a low-speed driving brush, and the third brush is a high-speed driving brush.

A windshield wiper motor of the present invention includes: a motor yoke of rotatably supporting an armature shaft; a four-pole magnet fixed on an inner surface of the motor yoke; an armature core having a plurality of coil-wound portions each arranged in a rotational direction and fixed at the armature shaft; a commutator having a plurality of commutator bars each arranged in the rotational direction and fixed at the armature shaft; winding wound around the coil-wound portions of the armature core and electrically connected with each of the commutator bars; a first brush slidingly contacted with the commutator bar; a second brush shifted from the first brush by 90 degrees and supplying a driving current to the winding; and a brush holder of storing the first brush and the second brush. The brush holder includes: a pair of flat portions opposite to each other; and a pair of joint portions of jointing between the pair of flat portions, and the first brush and the second brush are arranged on one side of the pair of joint portions.

In the windshield wiper motor of the present invention, on the other side of the pair of joint portions, a first opposite brush arranged away from the first brush by 180 degrees is arranged, and a second opposite brush arranged away from the second brush by 180 degrees and away form the first opposite brush by 90 degrees is arranged.

In the windshield wiper motor of the present invention, the first brush and the second brush are arranged on one side of the pair of joint portions, the third brush is arranged on the other side of the pair of joint portions, and a third opposite brush is arranged away from the third brush by 180 degrees.

In the windshield wiper motor of the present invention, a connection member is electrically connected with the commutator bars whose potentials are to be the same with each other.

According to the present invention, in the four-pole motor, the first brush and the second brush are shifted from each other by 90 degrees on one side of the pair of joint portions in the brush holder, so that the brush holder can be formed in an oval shape and can be sized down, and therefore, a whole windshield wiper motor can be sized down and thinly lightweight by the down sizing.

According to the present invention, the third brush is arranged on one side or the other side of the pair of joint portions in the brush holder, and therefore, the third brush can be arranged in the brush holder which is formed in the oval shape and is sized down. Also, the second brush is the low-speed driving brush, and the third brush is the high-speed driving brush, so that the whole windshield wiper motor whose rotational speed can be switched into the low-speed driving and the high-speed driving can be sized down and thinly lightweight.

BEST MODE FOR CARRYING OUT THE INVENTION

Hereinafter, a first embodiment of the present invention will be described with reference to the accompanying drawings.

As illustrated in FIGS. 1 to 5, a windshield wiper motor (motor) 10 includes: a bottomed substantial-cylindrical yoke (motor yoke) 11 storing an armature 20; a gear case 15 in which a flange portion 11$b$ in a periphery of an opening portion 11$a$ in the yoke 11 is fastened to be fixed through a screw 19A with a flange portion 15$b$ in an opening portion 15$a$ functioning as a brush-holder storing portion, and in which a speed-reduction mechanism (speed-reduction mechanism unit) 26 of reducing a rotational speed of an armature shaft 21 of the armature 20 is stored; and a gear-case cover 18 fastened to be fixed through a screw 19B so as to cover an opening portion 15$d$ of a speed-reduction-mechanism storing portion 15$c$ in the gear case 15.

Figure 2:
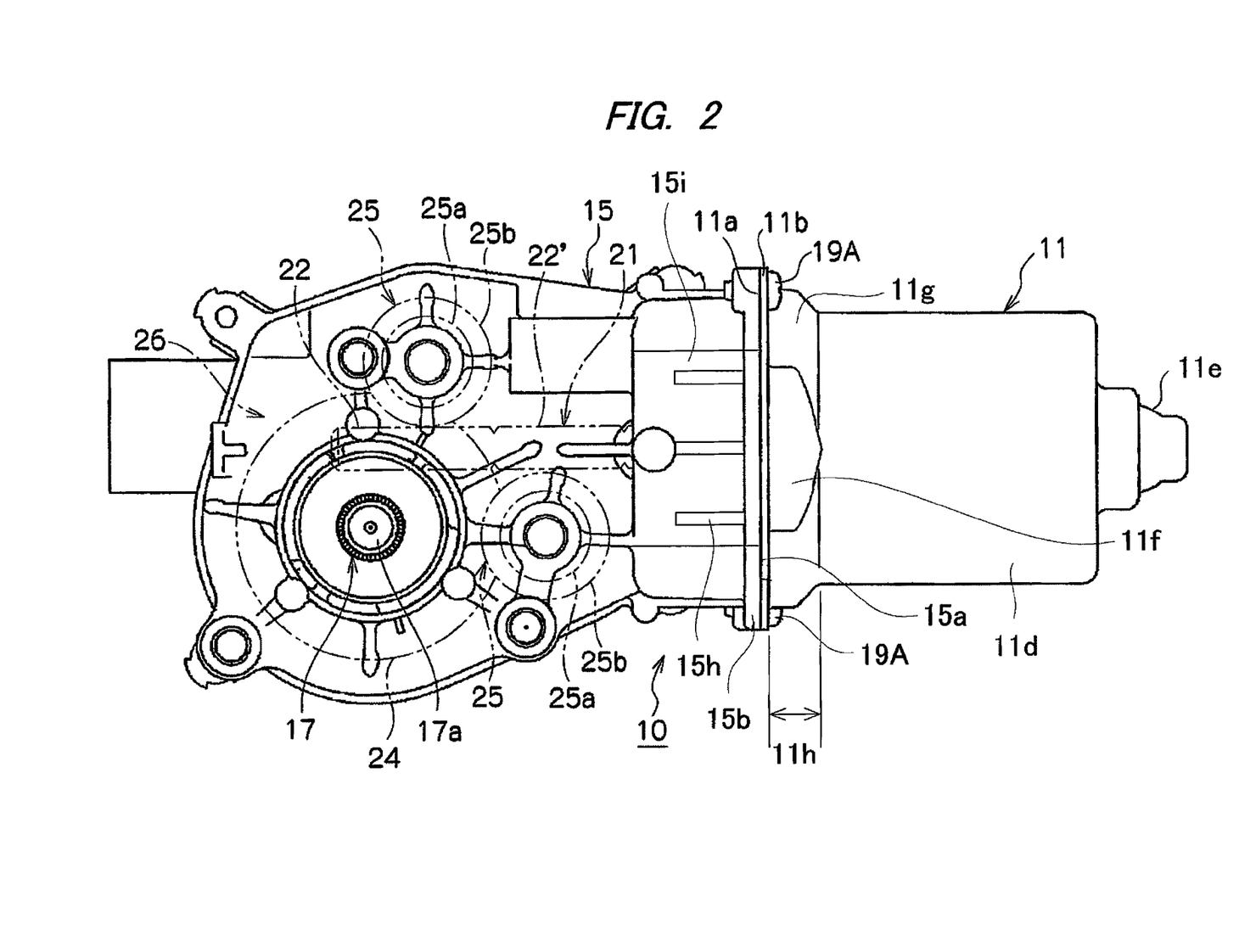
FIG. 2 is a plan view of the windshield wiper motor.
Figure 3A:
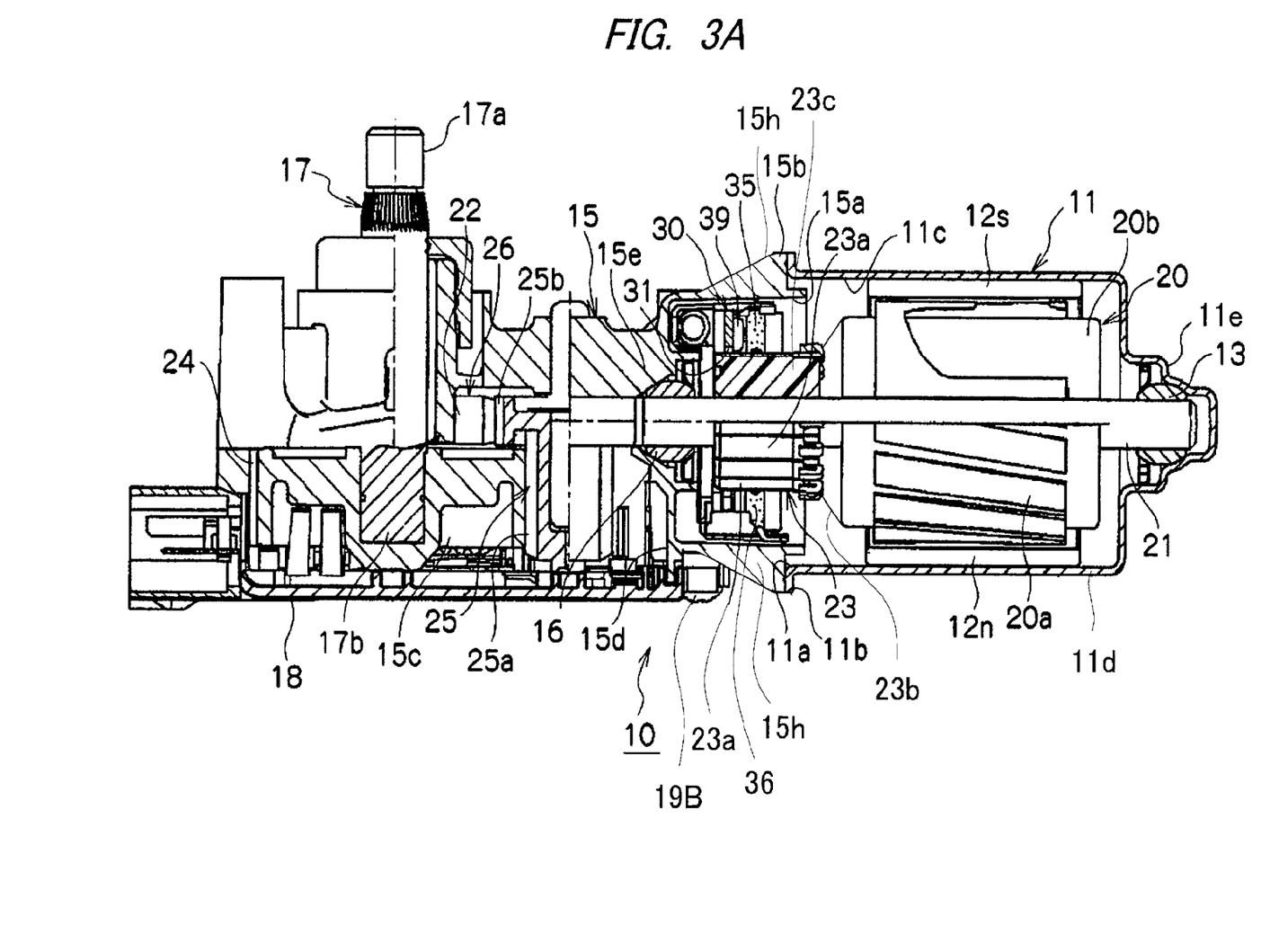
FIG. 3A is a cross-sectional view of the windshield wiper motor.
Figure 5:
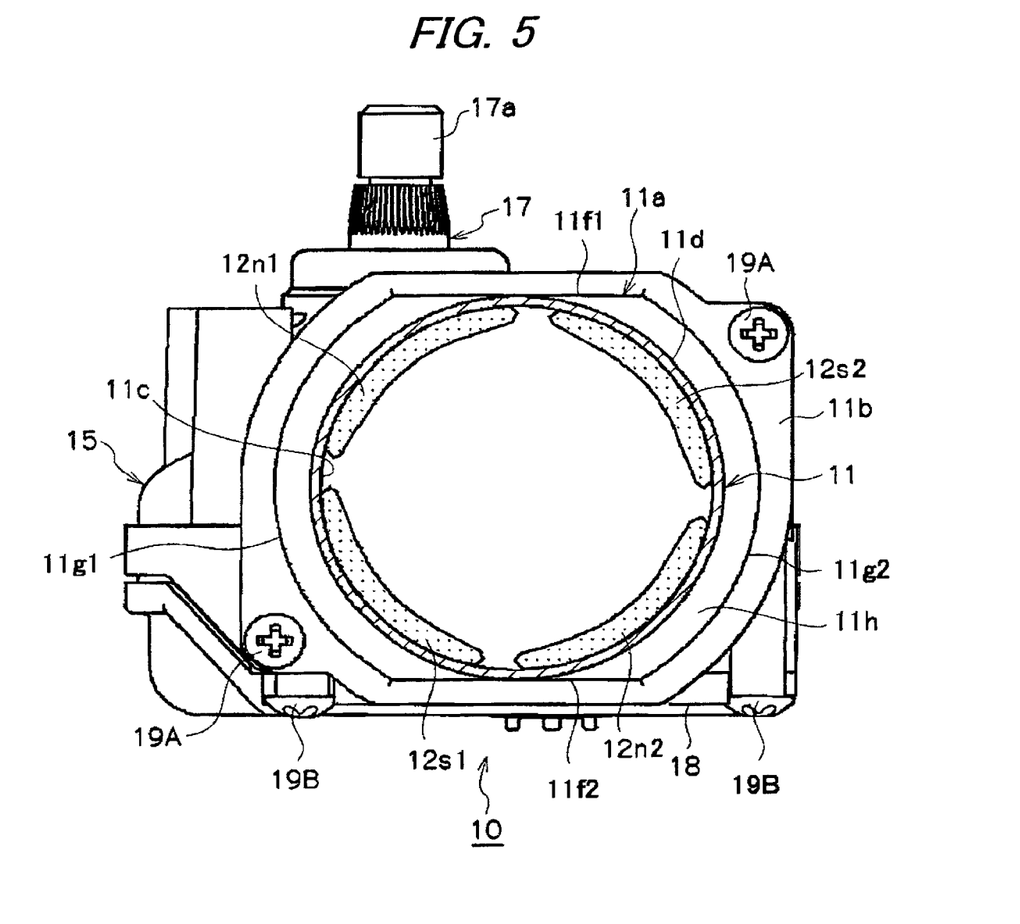
FIG. 5 is a cross-sectional view of a principal part of a yoke jointed to the gear case.

As illustrated in FIGS. 3A and 5, on an inner peripheral surface 11$c$ of the yoke 11, N-pole magnetized magnets 12$n$1 and 12$n$2 and S-pole magnetized magnets 12$s$1 and 12$s$2 are alternately adhered by adhesives or others so that they are totally 4 magnets, and a cylindrically-formed magnet storing portion 11$d$ is provided. And, as illustrated in FIG. 3A, the armature shaft 21 is rotatably supported by a shaft bearing 13 fitted on a bottomed cylindrical portion 11$e$ of the yoke 11, a shaft bearing 16 fitted on a cylindrical portion 15$e$ of the gear case 15, and others. As illustrated in FIGS. 2 and 3A, on a tip side of the armature shaft 21, a pair of worms 22 and 22' whose torsional directions are opposite to each other are formed.

Figure 3B:
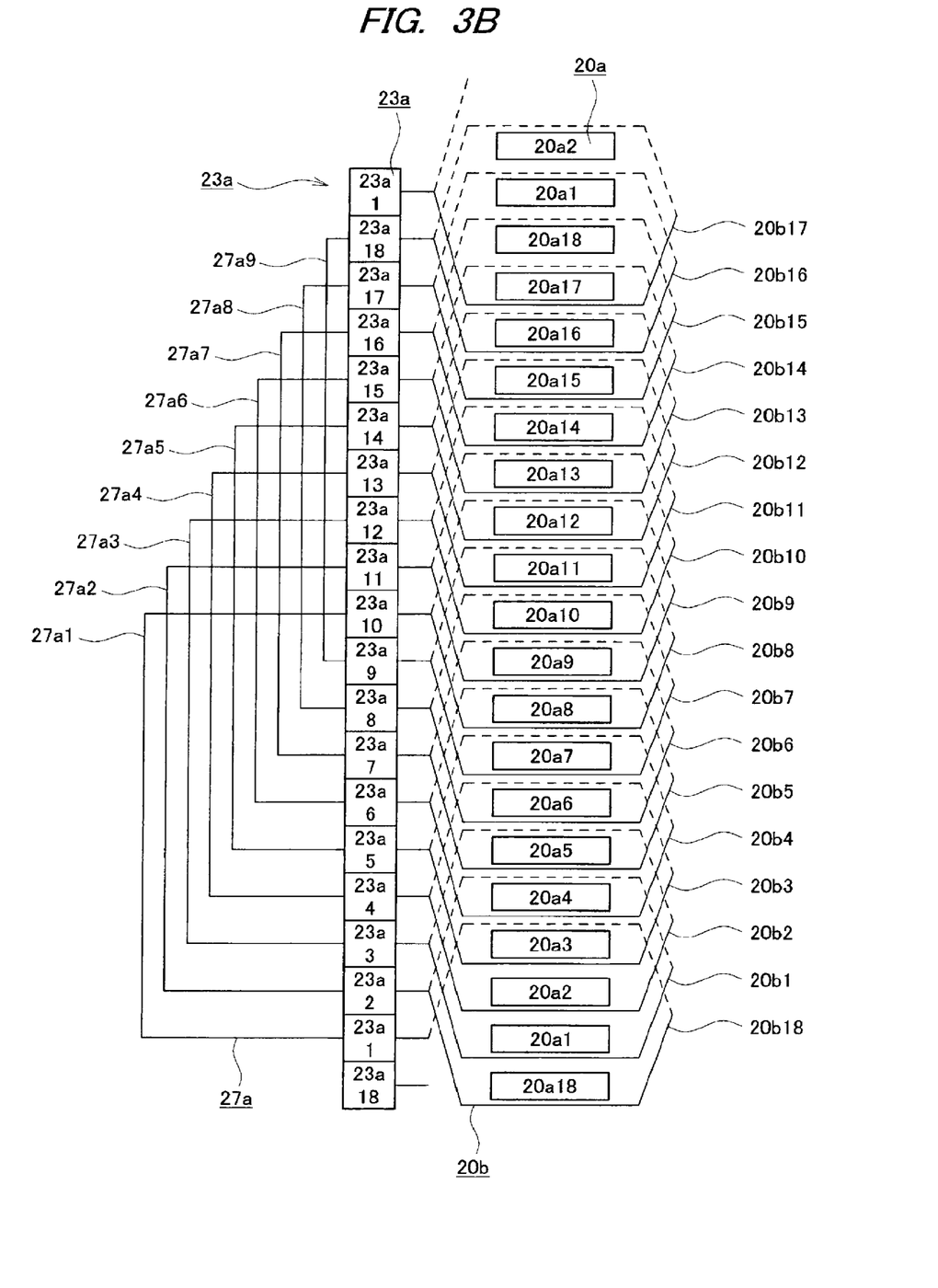
FIG. 3B is a winding diagram in an armature stored in the windshield wiper motor.

At a position opposite to the four-pole magnets 12$n$1, 12$n$2, 12$s$1, and 12$s$2 in the armature shaft 21, the armature 20 is attached. The armature 20 is fixed on a base-end portion side of the armature shaft 21, and is configured with: an armature core 20$a$ having 18 coil-wound portions 20$a$1 to 20$a$18 (which are also generally called "teeth") each arranged in the rotational direction; and an armature coil (winding) 20$b$ having 18 coil portions 20$b$1 to 20$b$18 wound around the coil-wound portions 20$a$1 to 20$a$18 of the armature core 20$a$. As illustrated in FIG. 3B, each of the coil portions 20$b$1 to 20$b$18 of the armature coil 20$b$ is repeatedly wound from one coil-wound portion of the armature core 20$a$ to a different coil-wound portion thereof with a predetermined interval as shifting toward the rotational direction of the armature shaft 21 by lap winding of a predetermined times, so that the coil is wound around each coil-wound portion, and is electrically connected with each commutator bar 23$a$ described later.

Figure 4:
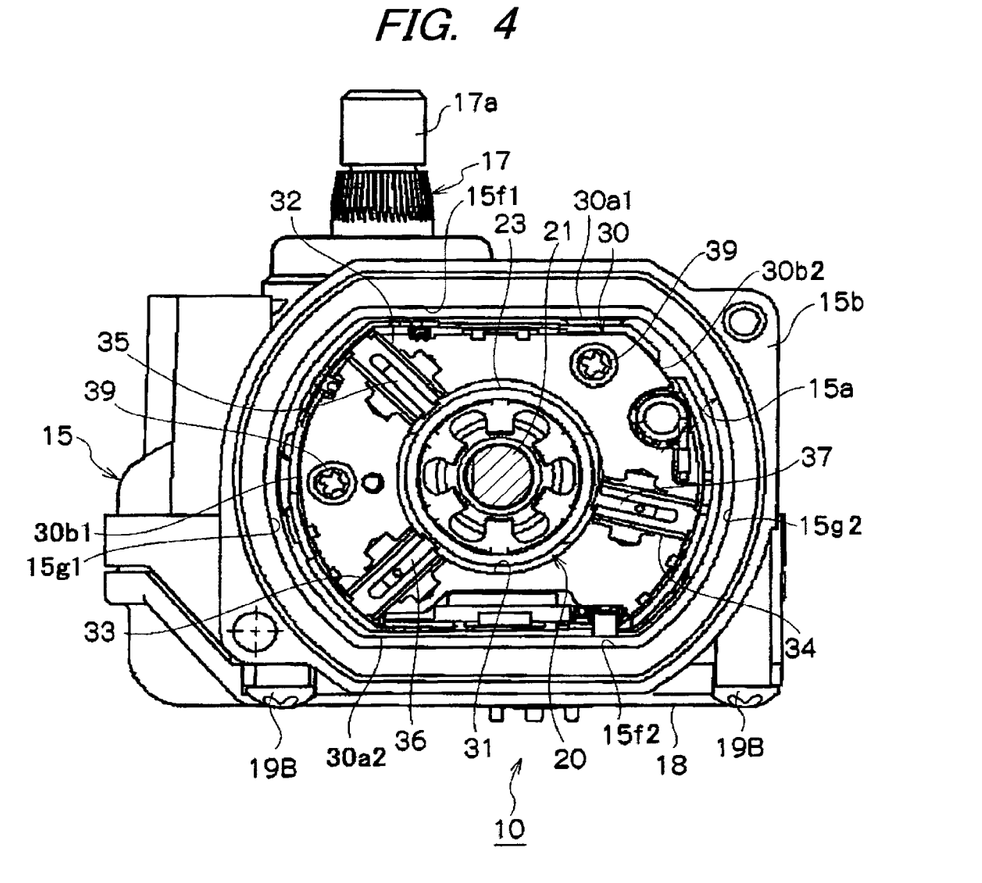
FIG. 4 is a front view of a gear case in the windshield wiper motor.

Also, as illustrated in FIGS. 3A and 4, at a position opposite to the opening portion 11$a$ of the yoke 11 in the armature shaft 21 and the opening portion 15$a$ of the gear case 15, a commutator 23 is fixed. As illustrated in FIG. 3B, the commutator 23 includes commutator body 23$c$ made of resin, and commutator bars the same number of commutator bars 23$a$1 to 23$a$18 as that of the coil-wound portions 20$a$1 to 20$a$18 of the armature core 20$a$, and each of the commutator bars 23$a$1 to 23$a$18 arranged in the rotational direction is electrically connected with the armature coil 20$b$. Further, commutator bars 23$a$1 to 23$a$18 are electrically connected with each other by a plurality of connecting lines 27$a$1 to 27$a$9 of an equalizer connection 27 functioning as a connection member, so that commutator bars electrically connected to each other via each connecting line become equal to each other in electric potential.

As illustrated in FIGS. 1 to 5, in substantially center of a ceiling-wall portion of the gear case 15, an upper portion 17$a$ of an output shaft 17 is protruded outside. To a lower portion 17$b$ of the output shaft 17, an output gear 24 is jointed. The output gear 24 is meshed with each small-diameter gear 25$a$ of a pair of worm wheels 25 and 25. Also, each large-diameter gear 25$b$ of the pair of worm wheels 25 and 25 is meshed with a pair of worms 22 and 22' in the armature shaft 21. These pair of worms 22 and 22', the output gear 24, and the pair of worm wheels 25 and 25 are stored inside the speed-reduction-mechanism storing portion 15$c$ of the gear case 15, and configure the speed-reduction mechanism 26. Note that the upper portion 17$a$ of the output shaft 17 is jointed to a wiper shaft of a wiper arm through a linkage mechanism (their illustrations are omitted), and when a windshield wiper motor 10 is operated, the wiper arm is swung in an area of predetermined angles to wipe a windshield glass.

As illustrated in FIGS. 3A and 4, at a position opposite to the commutator 23 inside the opening portion 15$a$ of the gear case 15, three brushes 35, 36, and 37 are attached through the brush holder 30 so as to contact with the commutator bars 23$a$ of the commutator 23. As illustrated in FIGS. 4 and 5, the opening portion 11$a$ of the yoke 11 is shaped in an oval shape which is formed of: a pair of flat portions 11$f$1 and 11$f$2 opposite to each other; and a pair of arc portions 11$g$1 and 11$g$2 jointing between the pair of flat portions 11$f$1 and 11$f$2. In the yoke 11, an opening joint portion 11$h$ and a bottomed cylindrical portion 11$e$ are monolithically formed so as to continuously connect between the opening portion 11$a$ having the oval shape and a magnet storing portion 11$d$ having a cylindrical shape. The opening portion 15$a$ of the gear case 15 on the other side is shaped in an oval shape which is formed of: a pair of horizontally-long flange-side flat portions 15$f$1 and 15$f$2; and a pair of arc portions 15$g$1 and 15$g$2. By providing the opening joint portion 11$h$ between the opening portion 11$a$ and the magnet storing portion 11$d$ of the yoke 11, the opening portion 11$a$ of the yoke 11 and the opening portion 15$a$ of the gear case 15 whose shape is larger than that of the magnet storing portion 11$d$ can be jointed to each other as the cylindrical magnet storing portion 11$d$ on which the four-pole magnet is arranged has a small diameter. In this manner, in addition to achieving a down-sized and lighten yoke, the windshield motor can be also sized down and lightened.

Figure 1:
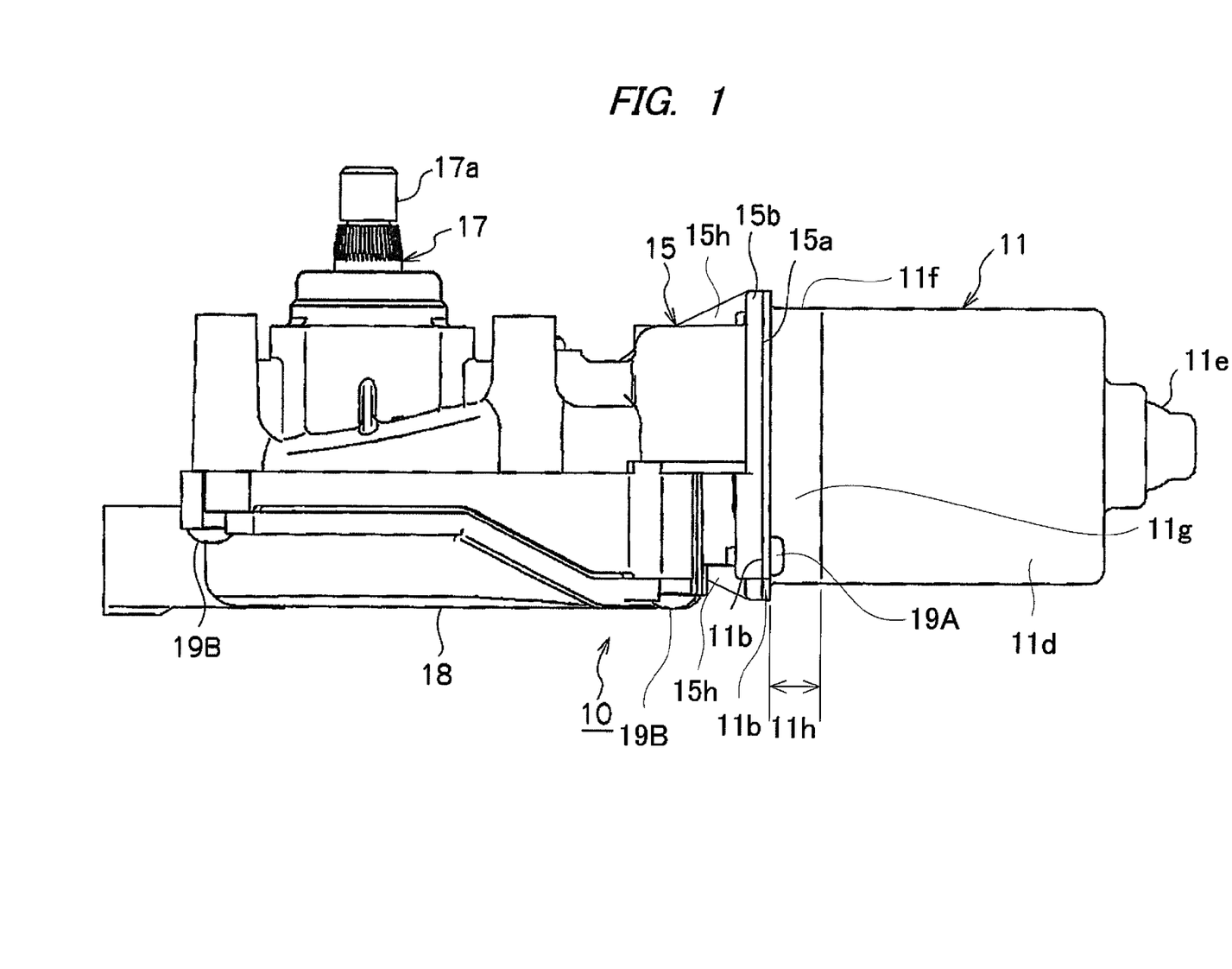
FIG. 1 is a side view illustrating a windshield wiper motor according to a first embodiment of the present invention.

Also, as illustrated in FIGS. 1 and 2, on a pair of opening-portion-side flat portions 15$i$ and 15$i$ continuously formed from the pair of flange-side flat portions 15$f$1 and 15$f$2 there are formed triangular-shaped ribs 15h each extending parallelly from the flange portion 15b of the opening portion 15a to a shaft center of the armature shaft 21. The rib 15h has a shape that a height of the rib 15h is smaller as the rib 15h is farther away from the flange portion 15b on the pair of opening-portion-side flat portions 15i and 15i side. In this manner, in addition to improving strength of the gear case 15, operating noises and vibrations can be improved by a state that resonance frequencies are difficult to be matched with each other. In the present invention, total 6 ribs 15h are formed such that three ribs are formed on each of the pair of opening-portion-side flat portions 15i and 15i. However, the number or lengths of the ribs 15h can be changed depending on setting of the windshield motor. Also, by setting the rib 15h so as not to be over a height of the flange portion 15b, layout performance is improved.

Inside the opening portion 15a of the horizontally-long oval-shaped gear case 15, an oval-shaped brush holder 30 is stored, the oval-shaped brush holder 30 being configured with: a pair of flat portions 30a1 and 30a2; and a pair of arc portions (joint portions) 30b1 and 30b2 jointing between the pair of flat portions 30a1 and 30a2, and the brush holder 30 is fastened to be fixed at the gear case 15 through screws 39. In a center of the oval-shaped brush holder 30, a circular-shaped through hole 31 in which the commutator 23 in the armature shaft 21 penetrates is formed. And, three brush boxes (brush storing portions) 32, 33, and 34 storing three brushes 35, 36, and 37 so as to freely come in and out are attached so as to interpose the through hole 31 in the brush holder 30.

Figure 6:
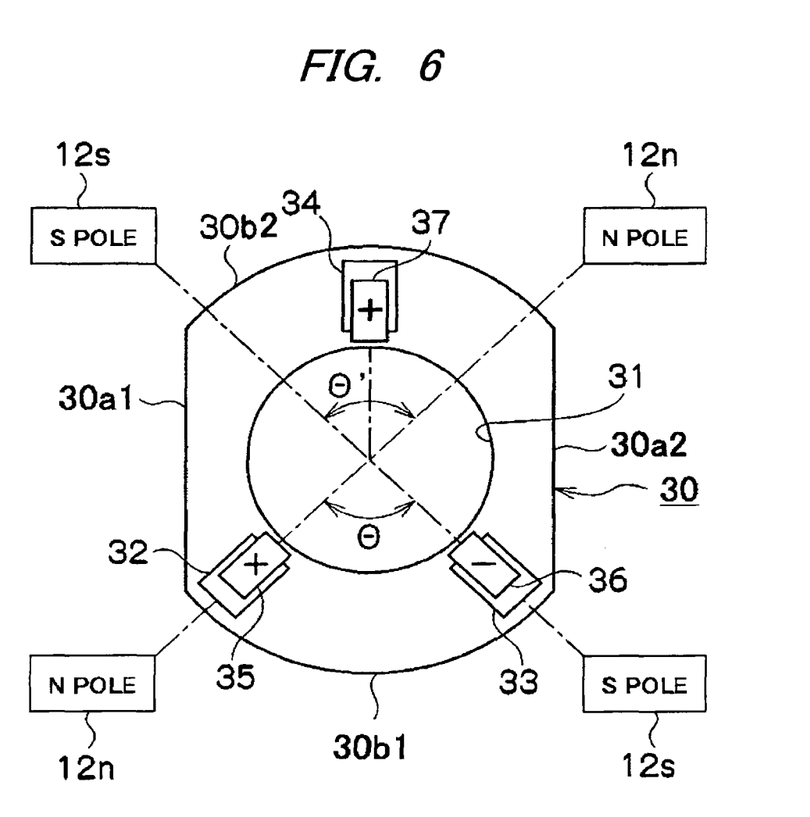
FIG. 6 is an explanation diagram describing a relation among magnetic poles, brush holders, and brushes stored in an opening portion of the gear case.

As illustrated in FIGS. 4 and 6, each of the first brush box 32 and the second brush box 33 is arranged at both corners on one side of four corners of the oval-shaped brush holder 30, that is on one side of the pair of arc portions 30b1 and 30b2, and the third brush box 34 is arranged between both corners on the other side of the four corners of the oval-shaped brush holder 30, that is on the other side of the pair of arc portions 30b1 and 30b2. That is, the first brush box 32 is arranged at a right-angle position to the second brush box 33 (a position shifted by 90 degrees around the armature shaft 21 in the rotational direction), and the third brush box 34 is arranged within an included angle $\theta'$ ($\theta'=90°$) opposite to an included angle $\theta$ ($\theta=90°$) formed by these first brush box 32 and second brush box 33.

And, as illustrated in FIGS. 4 and 6, the low-speed driving brush (second brush) 35 whose polar characteristic is positive (positive pole) is provided inside the first brush box 32, a common brush (first brush) 36 whose polar characteristic is negative (negative pole) is provided inside the second brush box 33, and the high-speed driving brush (third brush) 37 whose polar characteristic is positive (positive pole) is provided inside the third brush box 34, which are provided so as to freely slide. Each of these brushes 35, 36, and 37 is electrically connected with a non-illustrated motor control circuit, and can be switched into two-stage operation speed of the low-speed driving and the high-speed driving.

According to the windshield wiper motor 10 of the embodiment as described above, in the four-pole motor, the commutator bars 23a whose potentials are to be the same with each other are electrically connected with each other by the equalizer connection 27, and the common brush 36 and the low-speed driving brush 35 are arranged at the positions where they are shifted from each other by 90 degrees on one side of the pair of arc portions 30b1 and 30b2 in the brush holder 30, so that the brush holder 30 in which the brushes 35 and 36 are arranged so as to freely come in and out can be formed in the oval shape and can be sized down, and therefore, the whole windshield wiper motor 10 can be sized down and thinly lightweight by the down sizing.

That is, as illustrated in FIGS. 4 and 6, the brush holder 30 is formed in the oval shape, and each of the common brush 36 and the low-speed driving brush 35 is arranged at both corners on one side of four corners of the oval-shaped brush holder 30, so that the opening portion 15a functioning as the brush-holder storing portion of the gear case 15 storing the brush holder 30 can be formed in the horizontally-long oval shape and can be sized down as small as possible, and therefore, the whole windshield wiper motor 10 can be further sized down and thinly lightweight by the down sizing.

Also, the high-speed-driving brush 37 is arranged within the included angle of 90 degrees opposite to the included angle of 90 degrees formed by the common brush 36 and the low-speed-driving brush 35, that is on the other side of the pair of arc portions 30b1 and 30b2 in the oval-shaped brush holder 30, so that the high-speed-driving brush 37 can be arranged in the brush holder 30 which is sized down by the oval shape, and therefore, the whole windshield wiper motor 10 whose rotational speed can be switched into the low-speed driving and the high-speed driving can be sized down and thinly lightweight. Note that, in the present embodiment, the high-speed-driving brush 37 is arranged on the other side of the pair of arc portions 30b1 and 30b2 of the oval-shaped brush holder 30. However, this arrangement is not limited to this, and the high-speed-driving brush 37 may be arranged on one side of the pair of arc portions 30b1 and 30b2 of the oval-shaped brush holder 30, that is within the included angle of 90 degrees formed by the common brush 36 and the low-speed-driving brush 35.

Further, even if multipolarity is achieved in the windshield wiper motor 10 which is sized down and thinly lightweight and uses the common brush 36, the low-speed-driving brush 35, and the high-speed-driving brush 37, the rotational speed can be certainly switched into the low-speed driving and the high-speed driving.

Figure 7:
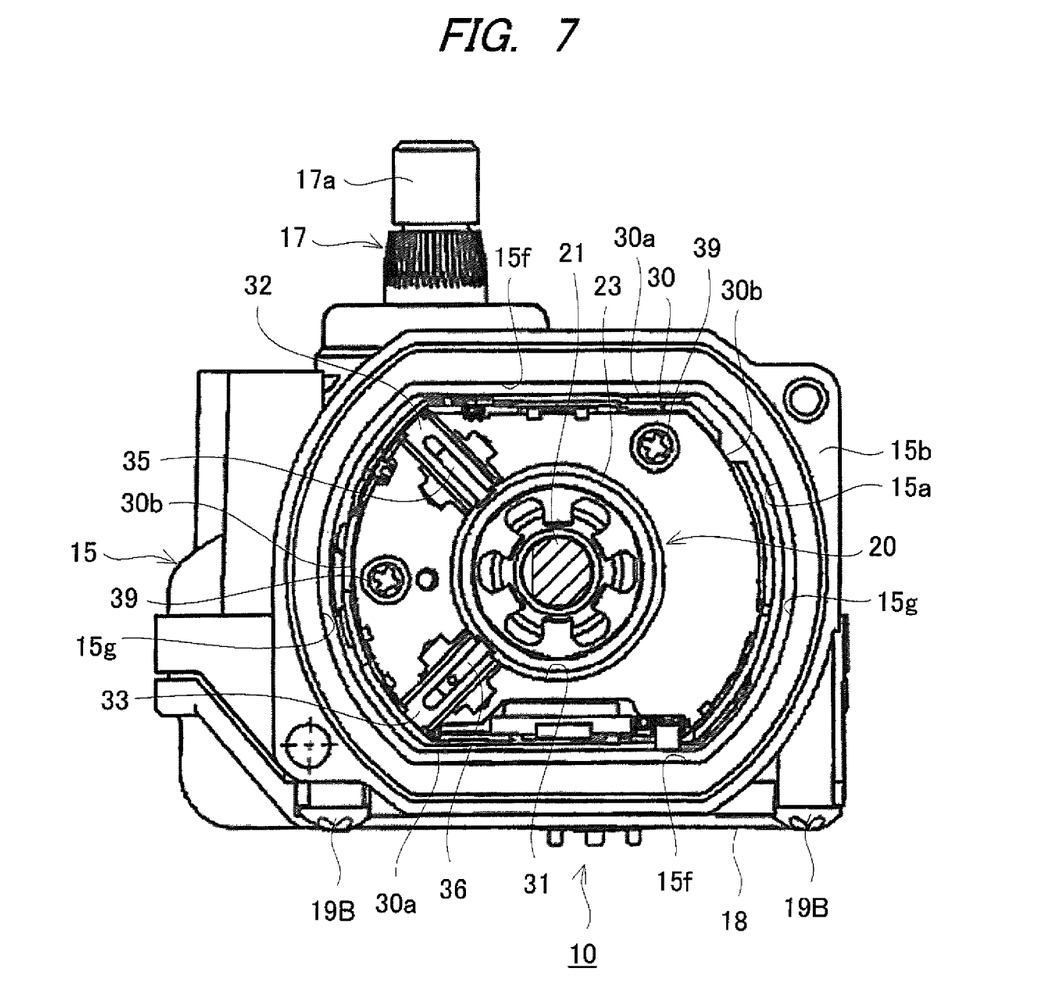
FIG. 7 is a front view of a gear case in a windshield wiper motor according to a second embodiment of the present invention.

FIG. 7 is a front view of a gear case in a windshield wiper motor according to a second embodiment. Note that the same components as those of the above-described first embodiment are described with the same symbols.

In the second embodiment, there is provided an armature 20 in which commutator bars 23a whose potentials are the same with each other (which are opposite to each other) of the plurality of commutator bars 23a are electrically connected with each other by the equalizer connection 27, the brush holder 30 is formed in the oval shape, and each of the first brush 36 and the second brush 35 is arranged at both corners on one side of four corners of the oval-shaped brush holder 30, so that the opening portion 15a functioning as the brush-holder storing portion of the gear case 15 storing the brush holder 30 is formed in the horizontally-long oval shape and can be sized down as small as possible, and therefore, the whole windshield wiper motor 10 can be further sized down and thinly lightweight by the down sizing. Note that, in the second embodiment, there is no brush functioning as the high-speed-driving brush. However, by providing a control circuit for controlling the driving speed of the windshield wiper motor 10 or a control circuit for switching the rotational direction of the armature 20, a wiper device with the control circuit which can be sized down and thinly lightweight can be provided.

Figure 8:
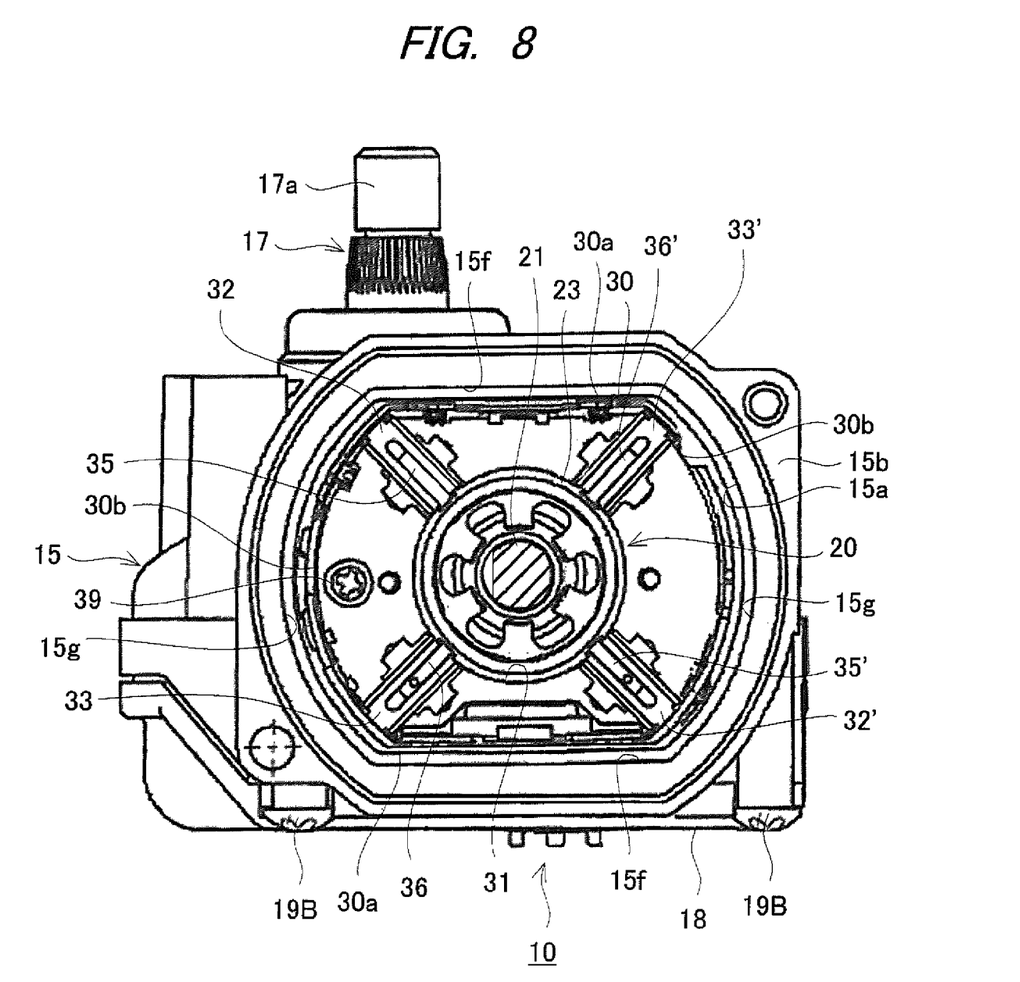
FIG. 8 is a front view of a gear case in a windshield wiper motor according to a third embodiment of the present invention.

FIG. 8 is a front view of a gear case in a windshield wiper motor according to a third embodiment. Note that the same components as those of the above-described first embodiment are described with the same symbols.

In the third embodiment, the brush holder 30 is formed in the oval shape, each of the first brush 36 and the second brush 35 is arranged at both corners on one side of four corners of the oval-shaped brush holder 30, and a fourth brush (first opposite brush) 36' opposite to the first brush 36 by 180 degrees is stored in a fourth brush box 33' and a fifth brush (second opposite brush) 35' opposite to the second brush 35 by 180 degrees is stored in a fifth brush box 32', the fourth brush and the fifth brush being arranged at both corners on the other side of the brush holder 30, so that the opening portion 15a functioning as the brush-holder storing portion in the gear case 15 storing the brush holder 30 is formed in the horizontally-long oval shape and can be sized down as small as possible, and therefore, the whole windshield wiper motor 10 can be further sized down and thinly lightweight by the down sizing.

Figure 9:
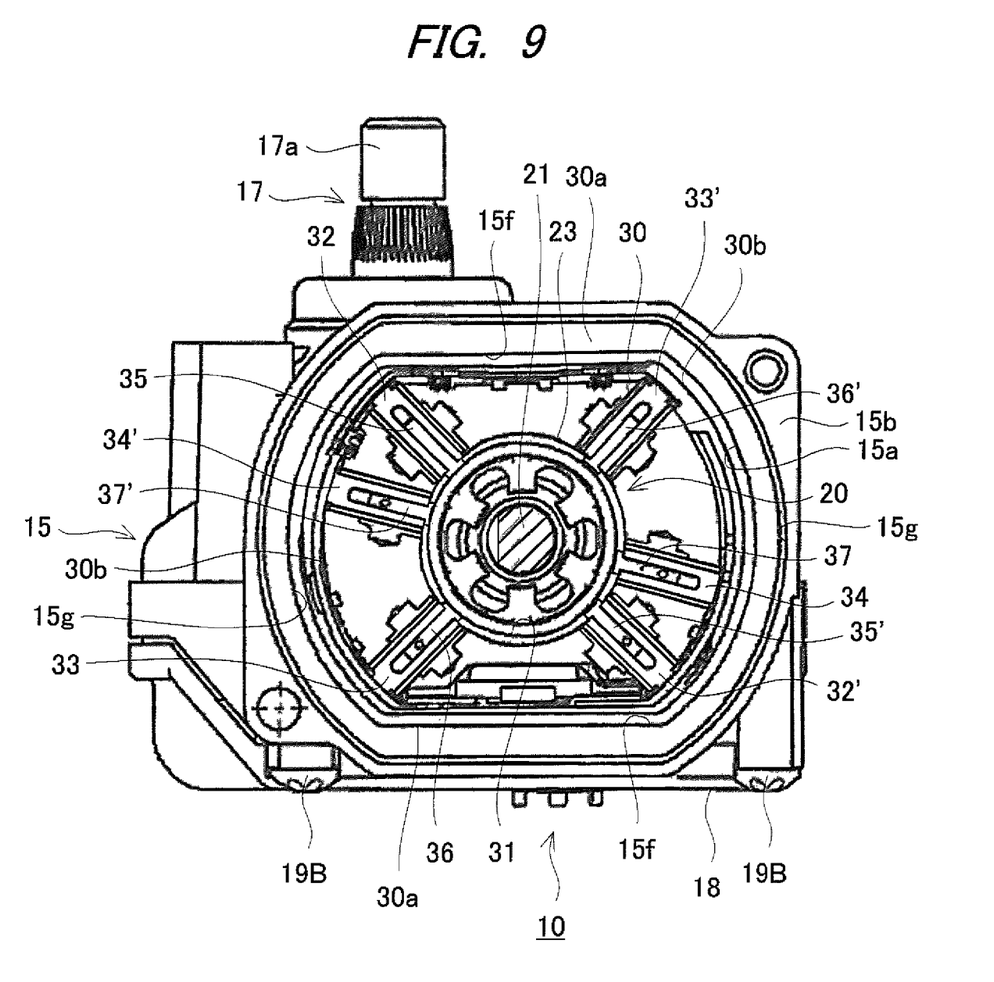
FIG. 9 is a front view of a gear case in a windshield wiper motor according to a fourth embodiment of the present invention.

FIG. 9 is a front view of a gear case in a windshield wiper motor according to a fourth embodiment. Note that the same components as those of the above-described first embodiment are described with the same symbols.

In the fourth embodiment, the brush holder 30 is formed in the oval shape, each of the first brush 36 and the second brush 35 is arranged at both corners on one side of four corners of the oval-shaped brush holder 30, and the third brush 37 is arranged between both corners on the other side of the four corners of the oval-shaped brush holder 30. Further, the fourth brush (first opposite brush) 36' opposite to the first brush 36 by 180 degrees is stored in the fourth brush box 33', and the fifth brush (second opposite brush) 35' opposite to the second brush 35 by 180 degrees is stored in the fifth brush box 32', the fourth brush and the fifth brush being arranged at both corners on the other side of the brush holder 30, and a sixth brush (third opposite brush) 37' opposite to the third brush 37 by 180 degrees is stored in a sixth brush box 34', the sixth brush being arranged between both corners on one side of the brush holder 30, so that the opening portion 15a functioning as the brush-holder storing portion of the gear case 15 storing the brush holder 30 is formed in the horizontally-long oval shape and can be sized down as small as possible, and therefore, the whole windshield wiper motor 10 can be further sized down and thinly lightweight by the down sizing.

Note that, according to the above-described embodiment, the brush holder is stored in the opening portion functioning as the brush-holder storing portion of the gear case. However, the brush holder may be stored in the opening portion of the yoke, or the brush holder may be stored across both of the opening portion of the gear case and the opening portion of the yoke.

The present invention can be applied in manufacturing a windshield wiper motor which is sized down and thinly lightweight.

While the present invention has been illustrated and described with respect to a particular embodiment thereof, it should be appreciated by those of ordinary skill in the art that various modifications to this invention may be made without departing from the spirit and scope of the present.

What is claimed is:
1. A windshield wiper motor comprising:
a motor yoke by which an armature shaft is rotatably supported;
a four-pole magnet fixed on an inner surface of the motor yoke;
an armature core having a plurality of coil-wound portions each arranged in a rotational direction and fixed to the armature shaft;
a commutator having a plurality of commutator bars each arranged in the rotational direction and fixed to the armature shaft;
a winding wound around the coil-wound portions of the armature core and electrically connected with the commutator bars;
a first brush slidingly contacted with the commutator;
a second brush slidingly contacted with the commutator, wherein the second brush is shifted from the first brush by 90 degrees, and wherein the second brush supplies a driving current to the winding;
a third brush slidingly contacted with the commutator; and
a brush holder in which the first brush and the second brush are stored,
wherein the brush holder includes a pair of flat portions opposite to each other and a pair of joint portions between the flat portions,
wherein the first brush and the second brush are arranged in a vicinity of one of the joint portions,
wherein a first opposite brush is arranged away from the first brush by 180 degrees,
wherein a second opposite brush is arranged away from the second brush by 180 degrees and away from the first opposite brush by 90 degrees in a vicinity of the other of the joint portions, and
wherein the third brush is arranged on the other side of the pair of joint portions, and a third opposite brush is arranged away from the third brush by 180 degrees.

2. A windshield wiper motor comprising:
a speed-reduction mechanism having an output shaft for driving an in-vehicle wiper device;
a plurality of gears for driving the output shaft;
a gear case accommodating the gears;
a yoke having a bottomed cylindrical shape;
four magnets cylindrically disposed on an inner surface of the yoke, wherein each of the magnets is arranged with alternating magnetic poles;
an armature accommodated in the yoke and surrounded by the magnets, the armature including:
an armature shaft rotatably supported by the yoke;
an armature core fixed to the armature shaft, the armature core having eighteen coil-wound portions;
a commutator fixed to the armature shaft, the commutator having first to eighteenth commutator bars insulated from each other; and
a winding having eighteen coil portions each wound around corresponding coil-wound portions of the armature core, wherein two terminals of each of the coil portions of the winding are electrically connected to two corresponding commutator bars arranged adjacent to each other;
an equalizer including a plurality of connecting lines, wherein each of the connecting lines is electrically connected to two corresponding commutator bars of the commutator symmetrically arranged with respect to the armature shaft; and
a brush assembly including:
a first brush, a second brush and a third brush disposed in sliding contact with the commutator bars of the commutator, wherein the second brush is shifted from the first brush by an angle of 90 degrees, wherein the third brush is shifted from each of the first and second brushes by an angle larger than 90 degrees, wherein the first brush is connected to a common electric potential, wherein a drive current causing the armature shaft to rotate at a low speed is selectively supplied to the second brush, and wherein a drive current causing the armature shaft to rotate at a high speed is selectively supplied to the third brush, and a brush holder formed into an oval shape, wherein the brush holder has first and second arc portions and first and second flat portions, wherein the first and second flat portions are connected to each other via the first and second arc portions, wherein the first and second brushes are arranged on the first arc portion, wherein the third brush is arranged on the second arc portion, and wherein each of the first and second flat portions extends in a direction perpendicular to the output shaft.

3. The windshield wiper motor according to claim 2, wherein the gear case has a first oval opening portion accommodating the brush holder, and wherein the yoke has a second oval opening portion connected to the first opening portion.

4. The windshield wiper motor according to claim 3, wherein the first opening portion has a third flat portion parallel to the first flat portion of the brush holder.

5. The windshield wiper motor according to claim 4, wherein the third flat portion has a plurality of ribs thereon.

6. The windshield wiper motor according to claim 2, wherein each of the coil portions is wound around four corresponding coil-wound portions of the armature core.

7. The windshield wiper motor according to claim 2, wherein the winding is wound around the coil-wound portions of the armature core in a lap winding manner.

8. A windshield wiper motor having a speed-reduction mechanism and an electric motor for driving the speed-reduction mechanism, the speed-reduction mechanism having an output shaft for driving an in-vehicle wiper device, a plurality of gears for driving the output shaft, and a gear case accommodating the gears, wherein the electric motor comprises:

means for generating a magnetic field having a yoke formed into a bottomed cylindrical shape and four magnetic poles cylindrically and alternatively disposed on an inner surface of the yoke;

an armature accommodated in the yoke and surrounded by the magnetic poles, the armature including:

an armature shaft rotatably supported by the yoke;

an armature core fixed to the armature shaft, the armature shaft having eighteen coil-wound portions;

a commutator fixed to the armature shaft, the commutator having eighteen commutator bars insulated from each other; and a winding having eighteen coil portions, wherein each of the coil portions is wound around corresponding coil-wound portions of the armature core, and wherein two terminals of each of the coil portions are electrically connected to two corresponding commutator bars arranged adjacent to each other;

an equalizer having nine connecting lines, wherein each of the connecting lines is electrically connected to two corresponding commutator bars of the commutator symmetrically arranged with respect to the armature shaft; and a brush assembly including:

a first brush, a second brush and a third brush disposed in sliding contact with the commutator bars of the commutator, wherein the second brush is shifted from the first brush by an angle of 90 degrees, wherein the third brush is shifted from each of the first and second brushes by an angle larger than 90 degrees, wherein the first brush is connected to a common electric potential, wherein a drive current causing the armature shaft to rotate at a low speed is selectively supplied to the second brush, and wherein a drive current causing the armature shaft to rotate at a high speed is selectively supplied to the third brush, and a brush holder formed into an oval shape, the brush holder having first and second arc portions and first and second flat portions, wherein the first and second flat portions are connected to each other via the first and second arc portions, wherein the first and second brushes are arranged on the first arc portion, wherein the third brush is arranged on the second arc portion, and wherein each of the first and second flat portions extends in a direction perpendicular to the output shaft.

9. The windshield wiper motor according to claim 8, wherein the gear case has a first oval opening portion in which the brush holder is accommodated, and wherein the yoke has a second oval opening portion which is connected to the first opening portion.

10. The windshield wiper motor according to claim 9, wherein the first opening portion has a third flat portion parallel to the first flat portion of the brush holder.

11. The windshield wiper motor according to claim 10, wherein the third flat portion has a plurality of ribs thereon.

12. The windshield wiper motor according to claim 8, wherein each of the coil portions is wound around four corresponding coil-wound portions of the armature core.

13. The windshield wiper motor according to claim 8, wherein the winding is wound around the coil-wound portions in a lap winding manner.

* * * * *